US011235911B2

(12) United States Patent
Koch

(10) Patent No.: US 11,235,911 B2
(45) Date of Patent: Feb. 1, 2022

(54) COUPLING SYSTEM

(71) Applicant: FLECOTEC AG, Badenweiler (DE)

(72) Inventor: Martin Koch, Neuenburg (DE)

(73) Assignee: FLECOTEC AG, Badenweiler (DE)

( * ) Notice: Subject to any disclaimer, the term of this patent is extended or adjusted under 35 U.S.C. 154(b) by 724 days.

(21) Appl. No.: 15/777,972

(22) PCT Filed: Nov. 23, 2016

(86) PCT No.: PCT/EP2016/001976
§ 371 (c)(1),
(2) Date: May 22, 2018

(87) PCT Pub. No.: WO2017/092857
PCT Pub. Date: Jun. 8, 2017

(65) Prior Publication Data
US 2018/0346201 A1 Dec. 6, 2018

(30) Foreign Application Priority Data
Dec. 3, 2015 (DE) .................. 10 2015 015 856.2

(51) Int. Cl.
*B65D 33/25* (2006.01)
*B65G 51/06* (2006.01)
*F16L 25/00* (2006.01)

(52) U.S. Cl.
CPC ..... *B65D 33/2541* (2013.01); *B65D 33/2566* (2013.01); *B65D 33/2591* (2013.01); *B65G 51/06* (2013.01); *F16L 25/00* (2013.01)

(58) Field of Classification Search
CPC ............ B65D 33/2541; B65D 33/2566; B65G 51/06; F16L 25/00
See application file for complete search history.

(56) References Cited

U.S. PATENT DOCUMENTS 4,485,534 A * 12/1984 Pilie
4,878,763 A 11/1989 Ausnit
(Continued)

FOREIGN PATENT DOCUMENTS

DE         103 35 325       3/2005
DE   10 2004 003 511       8/2005
(Continued)

OTHER PUBLICATIONS

International Search Report (ISR) dated Feb. 13, 2017 in International (PCT) Application No. PCT/EP2016/001976.

*Primary Examiner* — Zachary T Dragicevich
(74) *Attorney, Agent, or Firm* — Wenderoth, Lind & Ponack, L.L.P.

(57) ABSTRACT

A coupling system provides a media-conducting connection of two hose-shaped sections (10, 12). Each section has one coupling element (16, 18), with two coupling parts (20, 22) that can be separated from each other and that are detachably held to each other by closure elements (24) along a disconnecting point (26). The closure parts of one coupling element can be engaged with correspondingly designed closure elements (24) of the other coupling element (20, 22) to form the transport section. All closure elements (24) of the coupling parts (20, 22) point hose-inward, at least before forming the transport section. Upon producing the transport section, the respective disconnecting point (26) is arranged between the coupling elements (16, 18), transversely to the transport section.

13 Claims, 4 Drawing Sheets

(56) References Cited

U.S. PATENT DOCUMENTS

| | | | | |
|---|---|---|---|---|
| 6,004,032 A | * | 12/1999 | Kapperman | ....... B65D 33/2541 |
| 2003/0101552 A1 | * | 6/2003 | Plourde | ............. B65D 33/2541 |
| 2005/0084181 A1 | * | 4/2005 | Koch | |
| 2005/0251973 A1 | | 11/2005 | Sprehe | |
| 2008/0276435 A1 | | 11/2008 | Koch et al. | |
| 2012/0090279 A1 | * | 4/2012 | Untch | |
| 2015/0314922 A1 | | 11/2015 | Koch | |

FOREIGN PATENT DOCUMENTS

| | | |
|---|---|---|
| DE | 10 2009 018 565 | 11/2010 |
| WO | 2014/106632 | 7/2014 |

* cited by examiner

COUPLING SYSTEM

FIELD OF THE INVENTION

The invention relates to a coupling system for the media-conducting connection of two hose-like sections to form a common transport section. Each hose-shaped section has a coupling element with two coupling parts that can be separated from each other and that are detachably held together by closure elements along a disconnecting point. The coupling parts of one coupling element can be engaged with correspondingly formed closure elements of the other coupling element to form the transport section.

BACKGROUND OF THE INVENTION

A coupling system of this kind is known from DE 10 2009 018 565 B3, which permits an environment-proof connection of hose-shaped sections in the form of a first bundle with a second bundle. A closed docking position can be assumed and an environment-proof guidance of a media throughflow along a common transport section in a throughflow direction is permitted by the closure from the first bundle to the second bundle.

The second bundle has, facing the first bundle, an identical closure. To reach the opened docking position, the closure of the second bundle can be engaged with the closure of the first bundle. In this opened docking position, the connected closures of the bundles form a hose-shaped channel for the throughflow of the bulk material as media to be transported along the throughflow direction of the transport section. The profile strips arranged opposite one another as part of coupling parts of assignable or respective coupling elements enclose between them the bundle. For this purpose, the profile strips have, transverse to the throughflow direction of the transport section, closure elements that point hose-inwards, but that are also partially directed hose-outwards. These closure elements then can be easily contaminated from the environment side. This contamination is undesirably carried into the inside of the hose when the coupling elements are coupled with one another that can contaminate the transported load inside the transport section, which contamination is not acceptable in particular in the case of pharmaceutical applications of the coupling system. The known coupling system furthermore has a complicated construction due to the large number of required closure elements making it expensive to construct.

Another coupling system of this kind is disclosed in WO 2014/106632 A1. This other known coupling system likewise forms a possible closure with two profile strips for an at least partially flexible bundle arrangement for the environment-proof connection of a first bundle to a second bundle and for the environment-proof guidance of a throughflow in a throughflow direction along a common transport section through the closure from the first bundle into the second bundle in an opened docking position of the coupling system. The second bundle has, facing the first bundle, an identical closure that, in the opened docking position, is engaged with the closure of the first bundle and that, together with the closure of the first bundle forms a throughflow channel for the throughflow in the throughflow direction, with the profile strips lying opposite one another closing the respective bundle towards the outside.

In the separated state of the closures, a hose-inwardly pointing, projecting and pivotable closure element is engaged with a hose-outwardly pointing closure element of the closure in order to then close the respective closure. The docked coupling state of the closures, the hose-inwardly pointing, projecting closure element is engaged with a hose-outwardly pointing closure element of the complimentary closure to connect the closures to one another in a media-proof manner.

In this known closure system solution or coupling system solution too, closure elements are pointing hose-outwardly to the environment on the respective coupling part of a coupling element. They then create the possibility of accumulation of contaminants that, in the subsequent coupling state, could undesirably arrive in the inside of the hose-shaped transport section. Because the presented projecting closure elements for creation of the closure are pivotable for this purpose, this need to pivot once again calls for significant production expenditure, which increases the costs of the closure.

SUMMARY OF THE INVENTION

Given the above-mentioned prior art, the problem addressed by the invention is, while retaining the advantages of the known solution, namely the provision of functionally reliable, environment-proof docking systems for hose-shaped or channel-shaped bundles or sections with formation of a common transport section in at least one throughflow direction, to provide further improvement such that in any case when the part systems are coupled via the coupling elements no introduction of dirt from the outside to the inside can arrive in the media-conducting transport section and such that cost-effective production is ensured.

This problem is basically solved by a coupling system having all closure elements of the coupling parts point hose-inwardly at least before the formation of the transport section. This arrangement ensures that any contaminants coming from the environment cannot undesirably arrive via the coupling parts at the inside of the media-conducting transport section. A hermetic environment-proof closure is then obtained, and in fact in each state of the coupling system with its coupling parts to be docked.

The invention furthermore envisages that, at least when the transport section is produced, the respective disconnecting point between the coupling elements is arranged transverse to this transport section. Due to this connection arrangement transverse to the actual transport section, the coupling system solution according to the invention employs only one type of closure elements to be coupled with one another, with the total number of closure elements being kept small, which helps to reduce production costs. Furthermore, with the production of the transport section preferably by a slide specifically designed for this purpose and actuated by hand, the passage connection or coupling is produced in an almost force-free manner and very rapidly, which results in minimal assembly times and helps to reduce the assembly costs.

In one preferred embodiment of the coupling system according to the invention, the two separable from one another coupling parts of a coupling element are formed from profile strips, and each profile strip is connected to a track of an assignable section, which forms, with the track of the other profile strip of this one coupling part, the hose-shaped section. With this coupling system, any tube-shaped sections can be connected to one another in a media-conducting manner with formation of the overall transport section. The term "hose-shaped" also simply encompasses hose connections with a closed external circumference wall in the manner of channels or the like. The respective hose-shaped section can form a stiff tube or a flexible bundle, also with elastically flexible, tube-shaped closed wall parts. With these kinds of connections, a secure coupling or a closure can be obtained in a detachable manner, which is not released even when, under corresponding pressure, the media is passed over the transport section between the coupling elements.

Particularly preferably, the respective profile strip is designed flexible in the longitudinal direction of its strip extension, and is inherently stable in directions transverse thereto. A laying of parts of the profile strip on top of each other is then ruled out at least in the region of the engagement plane of the closure elements. By contrast with the known closure solution according to document WO 2014/106632 A1, it is then possible to use, instead of pivotable closure elements of a coupling part, inherently stable closure elements, which then provide at the point of the subsequent connection of the coupling parts to one another a stiff functionally reliable construction with high closure forces of the closure elements in this region, which prevent an undesirable release of the connection.

In another particularly preferred embodiment of the coupling system according to the invention, in its starting state, at least one profile strip of a profile strip pair for one coupling element in the manner of an offset has the closure elements along a free top side or face side at the end of this profile strip. Also, a channel is formed between this offset and the thereto parallel extending wall parts of the profile strip in this starting state. Due to the channel, a predefinable distance of closure elements to other wall parts of the profile strip is formed, with the base of the channel forming a type of pivot point, which allows this profile strip to be spread apart along a delimiting surface, even when it is engaged with an adjacent profile strip of the additional coupling element. A type of flat delimiting wall is then produced for the transport section in the region of the profile strips that are engaged with one another as a closure, which permits an uninterrupted, in particular obstacle-free media transport along the transport section in the coupled state.

In this context, it is furthermore particularly preferred that the channel of this profile strip has an outwardly projecting contact segment, on which a closure element of the assignable profile strip of a coupling element is supported. Due to this support, a reliable closure is obtained even in the outer edge region of the connection to be produced with a force application via the segment, which helps to increase the adhesion force of the profile strips against one another.

It has proven to be particularly advantageous to provide the channel-free assignable profile strip of the coupling assemblage in its starting state in the region of its respective closure element with a projection relative to the other wall parts of this profile strip. Due to this projection in conjunction with the channel-forming offset in the other profile strip, the closure elements engaged with one another in the starting state of the coupling have an overall block-shaped staggered arrangement, so that they are connected with one another in a simplified manner, but can also be separated from one another again.

In another particularly preferred embodiment of the coupling system according to the invention to produce the media-conducting transport section, the profile strips assigned to one another in pairs of each coupling element can be separated from one another along the common disconnecting point so as to cooperate, by their respective released closure element, with a corresponding closure element of the profile strip pair of the other coupling element. Adjacent tracks of each hose-shaped section segment then form the common transport section.

It is particularly preferred that in as much as, during the creation of the transport section, the respective disconnecting point of the two coupling elements extends transverse to the produced transport direction, the closure elements engaged with one another are arranged parallel to the transport section, and the closure elements passing through the respective disconnecting point of opposite coupling elements point in opposite directions.

Due to this reversed head/foot arrangement of the closure elements, the closure can be realized, but also released again, by a mechanical connection device, such as a hand-actuated slide or glider, with minimal closure force. Also, in the state of the current transport section creation, the individual closure elements of the coupled coupling elements are arranged such that they in any case point hose-inwardly and provide no contact surface for contaminants coming from the outside from the environment. This arrangement contributes to the sterility of the coupling system and its media to be transported therewith. This arrangement likewise has no equivalent in the prior art.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings that form a part of this disclosure and that are schematic and not to scale.

DETAILED DESCRIPTION OF THE INVENTION

Figure 4:
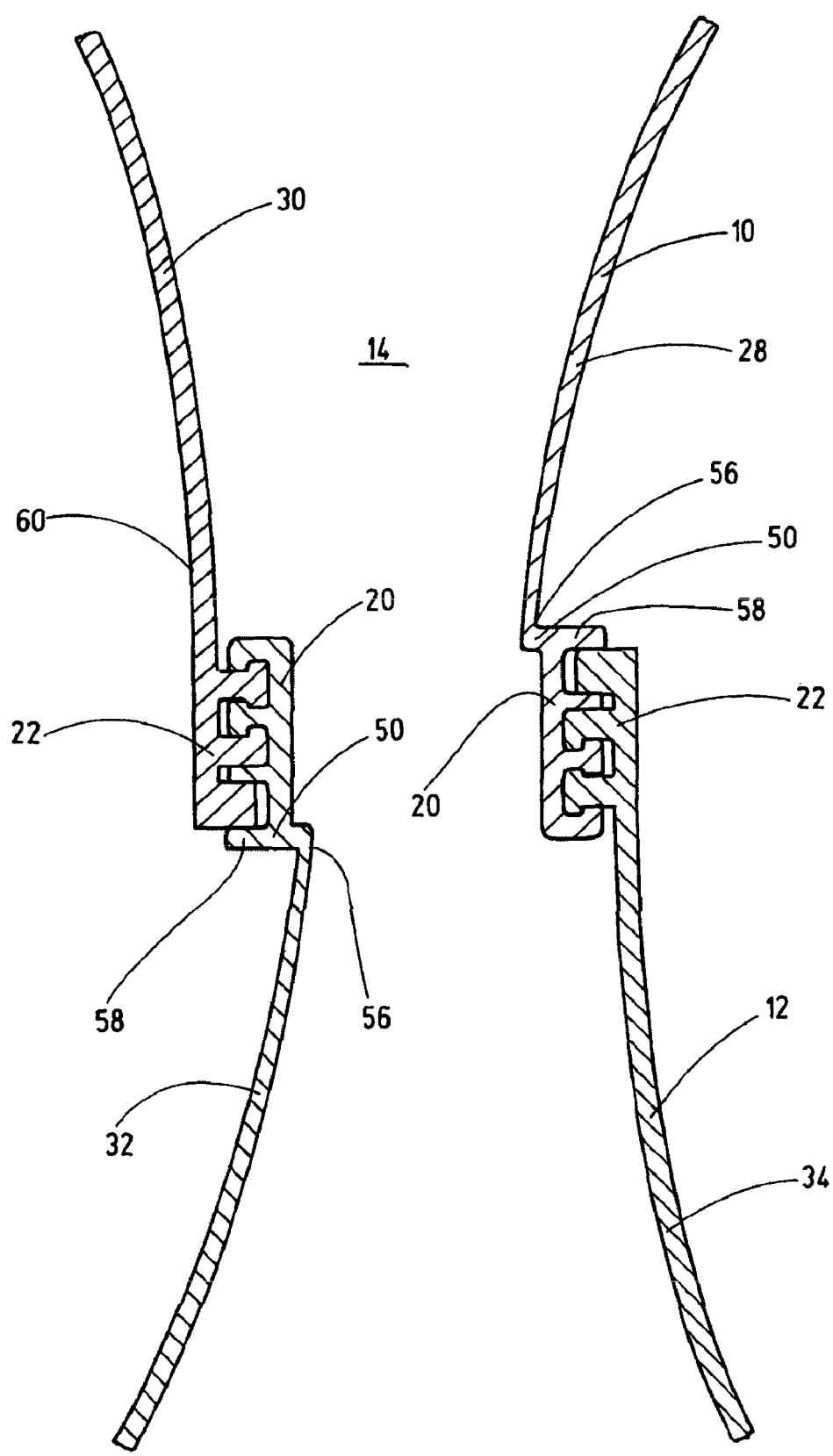

The coupling system according to the invention serves to connect in a media-conducting manner two hose-shaped sections 10, 12 in order to obtain a common transport section 14, as is depicted in particular in FIG. 4. Each section of the coupling system has a respective coupling element 16, 18, in which each coupling element has two coupling parts 20, 22 that can be separated from one another. The two coupling parts 20, 22 that can be separated from one another have individual closure elements 24, which are held together in a detachable manner along a common disconnecting point 26.

Figure 1:
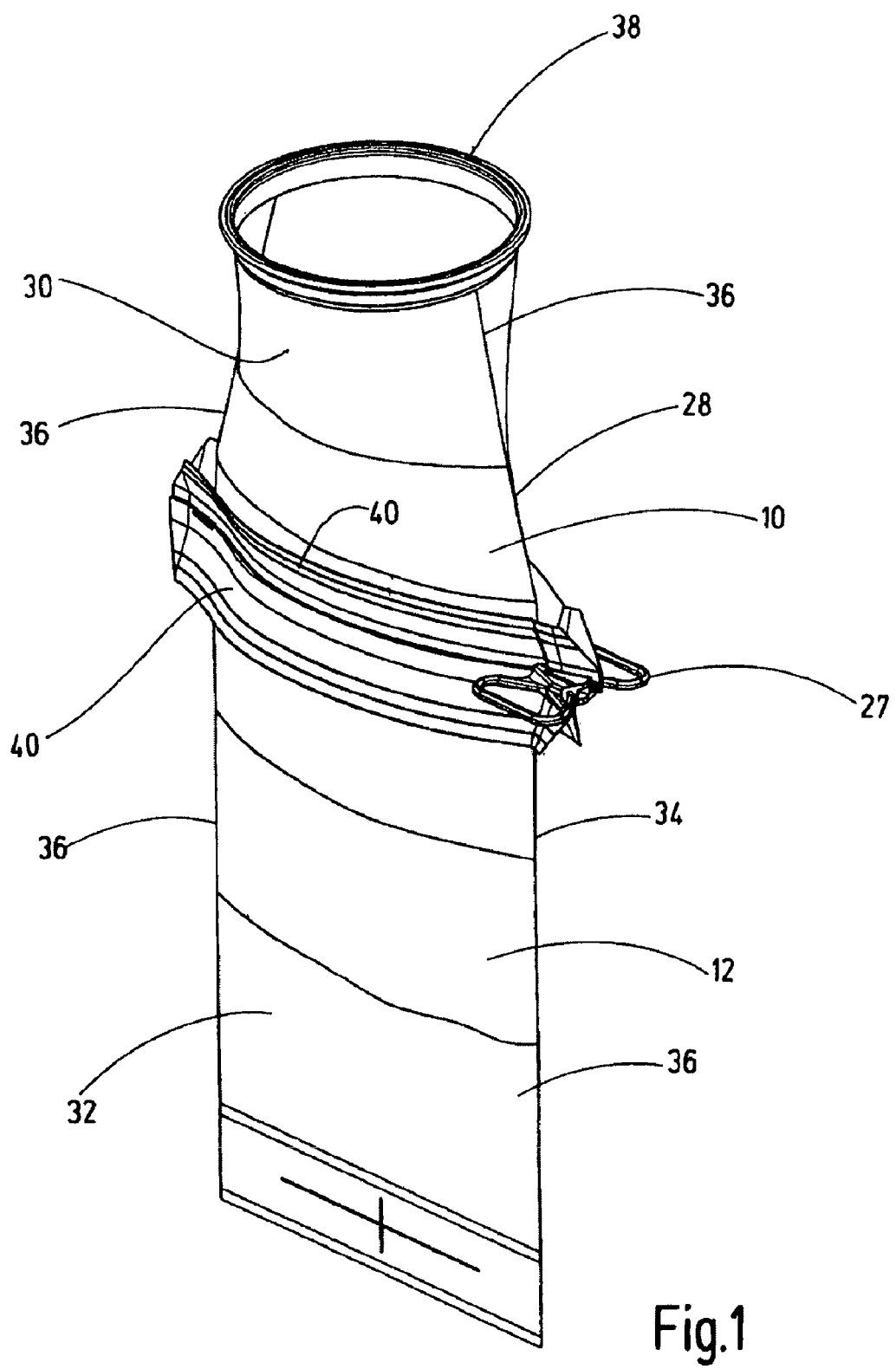
FIG. 1 is a perspective view of a coupling system for the media-conducting connection of two hose-shaped sections to form a common transport section using a glider according to an exemplary embodiment of the invention.
Figure 2:
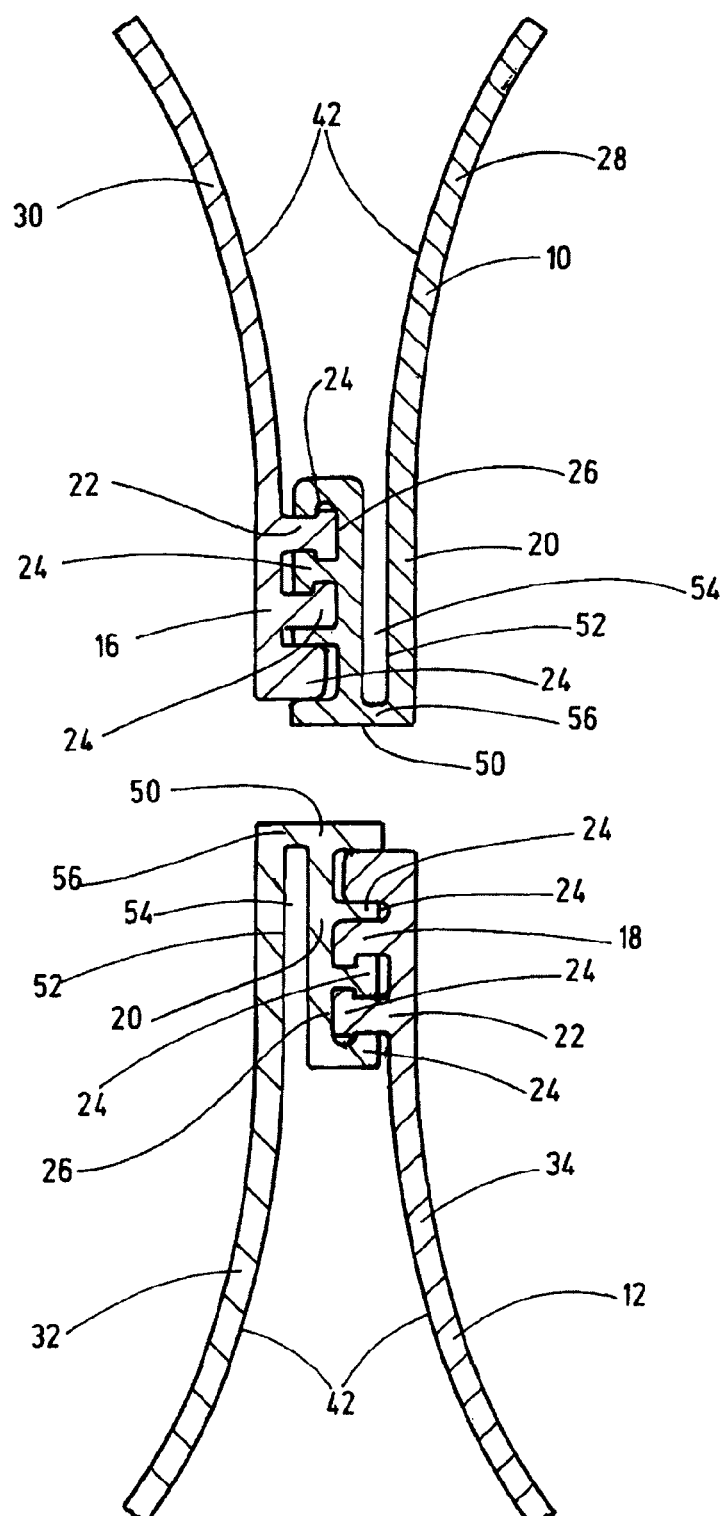
FIGS. 2 to 4 are partial side views in section of the coupling system according to the invention in various coupling states, from the uncoupled state (FIG. 2), to an intermediate coupling position (FIG. 3) and to the fully coupled connection solution, in which the two hose-shaped sections are connected in a media-conducting manner to form the common transport section (FIG. 4).
Figure 3:
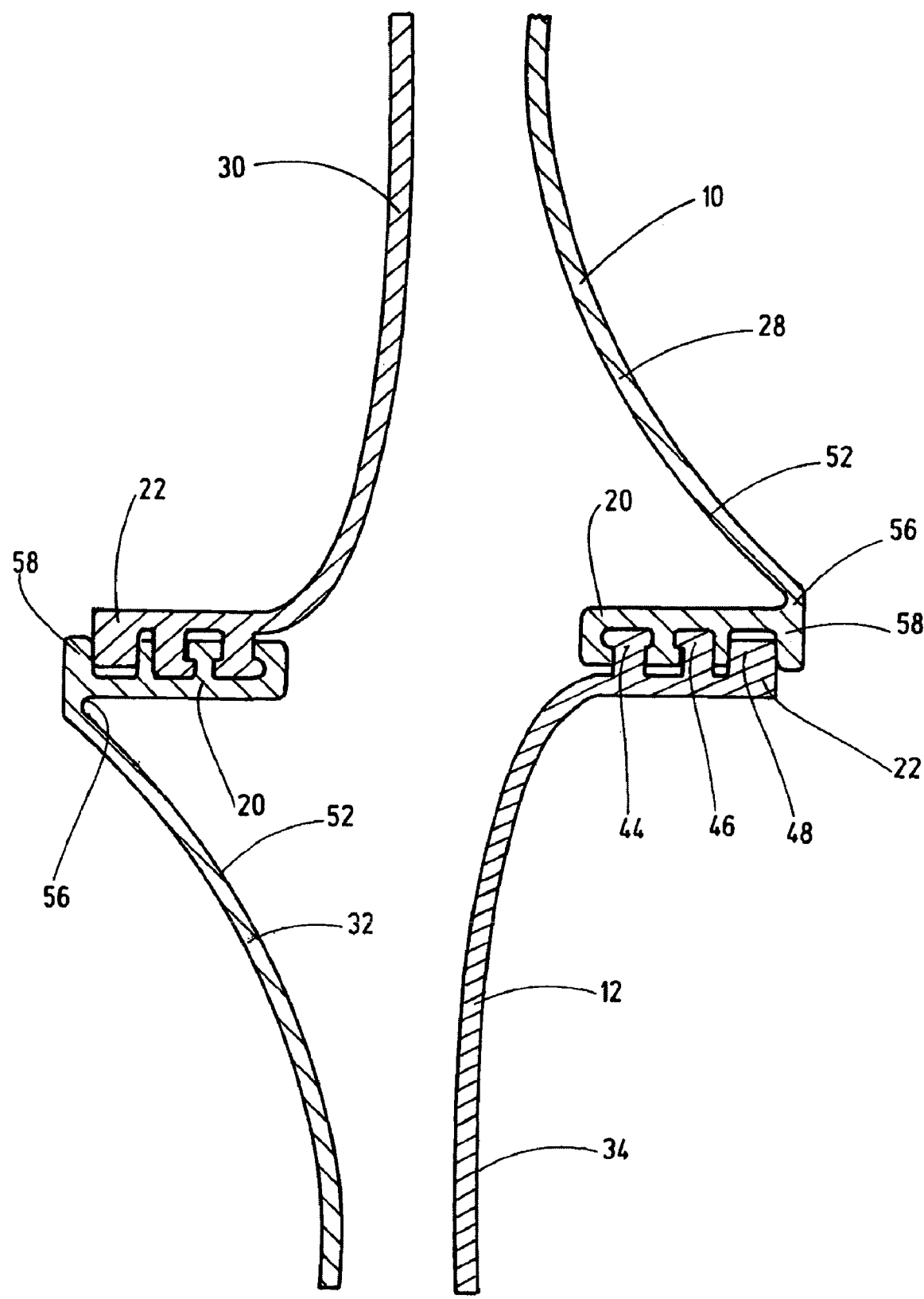

The sections 10, 12 are each formed from a foil-shaped hose made of plastic material, of which FIGS. 2 to 4 show, depicted in section, the respective front side and the back side 28, 30; 32, 34 in the bottom region thereof. These respective front and back sides 28, 30; 32, 34 are connected to one another in an integral manner at their longitudinal face sides adjacent and opposite to one another along connection lines 36, with the exception of the region of the profile engagement. As FIG. 1 in particular shows, the top hose-like section 10 is kept open by means of a circular receiving cross section 38, by which the hose assemblage 10, 12 can be connected for example to a filling machine that is not depicted in detail. It is then possible in the case of an opened coupling according to the depictions of FIGS. 3 and 4 to pour a filling material or transport material via the receiving cross section 38 and the section 10 into an opened bag as a hose-shaped section 12. Once the coupling is closed again (cf. FIG. 2) the filled tubular bag 12 in the closed again form can be removed therein. A plurality of hose-shaped bags as sections 12 can then be filled and closed in a consecutive sequence. Instead of the bag design, the section 12 can however be formed comparable to the section 10 and then serve for further transport of transport material via the common transport section 14 to another mechanical receiving device that is not depicted in detail. The section 12 then is opened at its bottom side or discharge side in a manner comparable with the section 10 at its receiving side.

As can be additionally seen from FIG. 1, the cross sections of the coupling parts 20, 22 depicted in FIGS. 2 to 4 are formed from profile strips 40, which the assignable sections 10, 12 made of foil material contact preferably in an integral manner. In particular, the coupling parts 20, 22 as extrusion components are formed integral with the assignable sections 10, 12.

A significant feature of the invention is that, as can be seen in particular from the depictions of FIGS. 2 to 4 and by contrast with solutions of the prior art, in every state of the coupling system, in other words also in the uncoupled and coupled states, the closure elements 24 always come to lie on the inner side 42 of the sections 10, 12. They are then never facing the environment, and any introduction of contaminants from the environment is reliably ruled out. All closure elements 24 of the coupling parts 20, 22 then point hose-inwardly at least before the formation of the transport section 14, but particularly preferably in each coupling state according to FIGS. 2 to 4. An additional feature according to the invention can be seen to be that, at least when the transport section 14 is produced, the respective disconnecting point 26 is, according to the depiction of FIG. 3, arranged between the coupling elements 16, 18 essentially transverse to this transport section 14. It is then possible to bring about with minimal activation force and if appropriate, simply by hand, the desired coupling to produce the coupling connection according to FIG. 4. A glider 27 is preferably used for this purpose, as is disclosed for example in DE 10 2009 018 565 B3.

As already stated, the coupling parts 20, 22 that can be separated from one another of each coupling element 16, 18 have profile strips 40. Each profile strip 40 is connected to a track of an assignable section 10, 12, which is formed from the respective front and rear sides 28, 30; 32, 34 of these sections 10 and 12. As can additionally be seen from FIGS. 2 to 4, the respective profile strip 40 is connected with its closure elements 24 to the closure elements 24 of the other profile strip 40 of a coupling element 16 and 18, which are formed in the manner of a tongue and groove connection or in the manner of a latch connection.

Viewed in the viewing direction of FIG. 2, both for the top segment 10 and for the bottom segment 12, the respective coupling parts 20, 22 are detached from one another with disengagement of the corresponding closure elements 24. Viewed in the viewing direction of FIG. 2 the top right coupling part 20 is then connected to the bottom right coupling part 22, and the left top coupling part 22 is connected to the released coupling part 20 below and likewise on the left. As already explained, the coupling state is obtained as a type of intermediate coupling according to FIG. 3, in which the respective disconnecting point 26 extends transverse to the vertically aligned transport section 14 between the two sections 10, 12.

As closure elements 24, double-T profiles 44, latching hooks 46 formed projecting at one side and guide bars 48 extending in a planar manner can be used, which engage in correspondingly formed groove-shaped latching recesses as additional closure elements 24, which then form the counterpart of the respective engaging coupling part 20 or 22. The respective disconnecting point 26 between the two coupling parts 20, 22 should be formed by at least one of the connection planes, on which the adjacent opposite closure elements 24 of a coupling part 20 or 22 are in contact with one another.

As can additionally be seen from FIG. 1, the respective profile strip 40 is designed to be flexible in the longitudinal direction of its strip extension. In the transverse direction thereto it is inherently stable such that a laying on top of one another of parts of the respective profile strip 40 is avoided at least in the region of the engagement plane, in particular in the form of the separation plane 26 of the closure elements 24. This arrangement ensures that coupling parts not belonging to one another cannot be undesirably connected with one another.

In the depicted starting state according to FIG. 2, the profile strip 40 in the form of the coupling part 20 is provided with a kind of offset or return 50, namely along the free top side or face side at the end of this profile strip 40. A channel 54 is formed between this offset 50 and the wall parts 52 of this profile strip extending parallel thereto. This channel 54 is significant in that when the individual coupling elements 16, 18 are assembled with formation of the transport section 14, it helps to form a joint 56. Joint 56 allows the sections 10, 12 to stand upright such that an extension of this profile cross section is obtained in order to then obtain a transport section trajectory that extends in an uninterrupted manner (cf. FIG. 4). If the sections 10, 12 come under tensile stress in the coupled state according to FIG. 4, a reliable force transmission via the corresponding closure elements 24 to the coupling elements 16, 18 is furthermore achieved. Another achievement is that the channel 54 of this profile strip in the form of the coupling part 20 has an outwardly projecting contact segment or positioning portion 58, on which a closure element 24 of the assignable profile strip 40 in the form of the corresponding coupling part 22, formed by a guide bar 48 here, can be supported. This increases the engagement reliability of the coupling elements 16, 18.

This construction is further facilitated in that in the starting state the channel-free assignable profile strip 40 in the form of the coupling part 22 has, in the region of its respective closure element 24, a projection relative to the other wall parts 60 of this profile strip 40. In this way, a force-free engagement of the coupling parts 20, 22 with one another is obtained. Any tensile forces acting on the sections 10, 12 do not compromise the functionally reliable engagement of the assignable closure elements 24 in the region of their common engagement along the respective disconnecting point 26.

To form the media-conducting transport section 14, the profile strips 40 assigned to one another in pairs of each coupling element 16, 18 can be separated from one another along the common disconnecting point 26 starting from the uncoupled state according to FIG. 2. In order to cooperate with their respective released closure element 26 with a corresponding closure element 24 of the profile strip pair 40 of the other coupling element 18 or 16, adjacent tracks of each hose-shaped segment 10, 12 form the common transport section 14 with one another, as is depicted in the final coupled state according to FIG. 4.

If, in accordance with the depiction of FIG. 3, during creation of the common transport section 14, the respective disconnecting point 26 of the two coupling elements 16, 18 extends transverse to the produced transport direction 14. The closure elements 24 engaged with one another are arranged parallel to the transport section 14, with the closure elements 24 penetrating the respective disconnecting point 26 of opposite coupling elements point in opposite directions (head/foot arrangement). Both in the case of an opening or closing of the coupling with a horizontally extending connection arrangement according to FIG. 3 and in the case of a type of mechanical connection by a hand-actuatable slide or glider 27, which can also take place automatically, only a little actuation force is required, which simplifies the functional creation of the coupling in every installation situation.

The subject of the invention is also a connection device with the preferably hand-actuatable slide or guider 27 that, for receiving the individual coupling elements 16, 18 of the coupling system has for this purpose individual chambers with a slide guide. The slide guide separates pairs of coupling elements 16, 18 with their hose-shaped sections 10, 12 in order to connect them, preferably in a detachable manner, with a corresponding pair of coupling elements 18 or 16 of the coupling system and with formation of the transport section 14.

While one embodiment has been chosen to illustrate the invention, it will be understood by those skilled in the art that various changes and modifications can be made therein without departing from the scope of the invention as defined in the appended claims.

The invention claimed is:

1. A coupling system for conveying media in a combined transport section, the coupling system comprising:
first and second tubular section parts with wall parts; and
first and second coupling elements on the first and second tubular section parts, respectively, each of the first and second coupling elements having first and second coupling parts separable from one another and detachably held together by fastening elements thereof along a separation joint, the first coupling element being detachably engageable with the second coupling element by the respective fastening elements producing a formed transport section between the first and second tubular section parts, all of the fastening elements of the first and second coupling parts extending from the wall parts toward insides of the first and second tubular section parts before coupling of the fastening elements producing the formed transport section, the respective separation joint between each of the first and second coupling elements being transversely arranged relative to the formed transport section, each of the wall parts having fastening parts only on one side thereof.

2. A coupling system according to claim 1 wherein
each of the first and second coupling parts comprises a profile strip connected to a web of the respective tubular section part, the profile strip of each the first and second tubular section parts providing the respective coupling part.

3. A coupling system according to claim 2 wherein
the respective profile strips engage with the fastening elements thereon in tongue-and-groove connections.

4. A coupling system according to claim 2 wherein
the respective profile strips engage with the fastening elements thereon in latch connections.

5. A coupling system according to claim 2 wherein
the profile strips engage with the fastening elements thereon are flexible in longitudinal directions of the profile strips and are inherently stable in directions transverse to the longitudinal directions, preventing placing portions of the respective profile strips on top of one another at least in regions of an engagement plane of the fastening elements.

6. A coupling system according to claim 2 wherein
the profile strips of the first coupling parts comprise returns with the fastening elements thereof on free inner end faces of the first coupling parts; and
channels are provided between the returns and wall portions of the respective profile strips extending parallel to the returns.

7. A coupling system according to claim 6 wherein
the channels comprise positioning portions protruding outwardly from the inner end faces and supporting the respective second coupling parts.

8. A coupling system according to claim 6 wherein
the profile strips of the second coupling parts do not have the channels of the first coupling parts and comprise projections relative to wall portions thereof in a region of the fastening elements thereof.

9. A coupling system according to claim 2 wherein
the profile strips of the first coupling element are separable along the separation joint thereof from one another opening the first tubular section part and exposing the fastening elements thereof;
the profile strips of the second coupling element are separable along the separation joint thereof from one another opening the second tubular section part and exposing the fastening elements thereof; and
the respective profile strips of the first coupling element are engageable with the respective profile strips of the second coupling element by the fastening elements thereof making the formed transport section between the first and second tubular section parts.

10. A coupling system according to claim 9 wherein
the separation joints of the first and second coupling elements extend transversely to a transport direction through the formed transport section with the respective profile strips of the first coupling element and the respective profile strips of the second coupling element being parallel to the formed transport section and with the respective fastening elements extending in opposite directions through the respective separation joints, when the respective profile strips of the first coupling element are engageable with the respective profile strips of the second coupling element by the fastening elements thereof.

11. A coupling system according to claim 1 wherein
first and second sliders each comprises first and second chambers receiving the respective first and second coupling elements and each comprises a slide guide separating the first and second coupling parts of the respective first and second coupling elements.

12. A coupling system according to claim 11 wherein
the first and second sliders are capable of being activated by hand.

13. A coupling system according to claim 6 wherein
the returns have a thickness not less than a thickness of the first and second tubular section parts.

* * * * *